United States Patent Office 3,371,997
Patented Mar. 5, 1968

3,371,997
PROCESS FOR MAKING HIGH STRUCTURE
CONDUCTIVE CARBON BLACK
Merrill E. Jordan, Walpole, and John F. Hardy, Andover,
Mass., assignors to Cabot Corporation, Boston, Mass.,
a corporation of Delaware
No Drawing. Filed Dec. 30, 1964, Ser. No. 422,432
9 Claims. (Cl. 23—209.4)

ABSTRACT OF THE DISCLOSURE

The present invention provides a method for producing high structure, conductive carbon blacks which broadly comprises a two-stage carbon forming reaction. In the first stage, a carbon black aerosol is produced by the well known furnace process, i.e., a hydrocarbon make fuel is charged into a heated zone wherein cracking or incomplete combustion thereof occurs. It is important that the carbon black aerosol effluent produced in said first stage, (1) comprise a substantial quantity of hydrocarbonaceous materials representing at least about 1% by weight of the carbon black product, and (2) have a temperature of at least about 1200° F. In the second stage of the present process, sufficient acetylene is charged into the above-described aerosol to (1) raise the temperature thereof to at least about 2250° F., and (2) provide an acetylene based carbon black product representing at least about 10% by weight of the total black product. The temperature rise realized in said second stage not only serves to produce carbon black from the acetylene charge but also to further decompose the hydrocarbon residue forming part of the first stage reaction products.

---

Furnace carbon blacks are important articles of commerce being extremely useful, for example, as fillers, pigments and reinforcing agents in rubbers and plastics. Broadly, the furnace process comprises the cracking and/or incomplete combustion of a hydrocarbon feedstock such as natural gas or cycle stock in an enclosed conversion zone at temperatures above 1800° F. to produce carbon black. The carbon black entrained in the gases emanating from the conversion zone is then cooled and collected by any suitable means. Said process has been found to be extremely advantageous in that precise control of the properties of the carbon black product can be achieved.

Heretofore, however, it has been extremely difficult and normally not commercially feasible to produce furnace blacks having high "structure" and electrical conductivity. Blacks having said attributes are generally well suited for particular applications in batteries and as gelling agents, fillers for tar-bonded refractories, electrically conductive rubbers, etc. Heretofore, such blacks have been generally produced commercially solely from acetylene, which compound is expensive and contributes substantially to high product cost. In accordance with the process of the present invention, however, less costly blacks having high "structure" and electrical conductivity can be produced.

It is a principal object of the present invention to provide a novel process for the production of carbon black.

It is another object of the present invention to provide a process for producing high structure furnace blacks.

It is another object of the present invention to provide a process for producing furnace blacks having high electrical conductivity.

Other objects and advantages of the present invention will in part be obvious and will in part appear hereinafter.

The term "structure" relates to a primary property of carbon black which is not influenced consistently by any property or combination of properties. In general, the term is used in the art to designate the extent of aggregation of the primary particles of a black and said aggregation is best evaluated by electron microscope examination. Since all blacks manifest some degree of aggregation of the primary particles, a particular black is classified as being a low, normal or high structure black depending upon the relative degree of aggregation manifested thereby. Delineation between the classifications of low, normal or high structure is generally not well defined. However, a measurable quality which those skilled in the art recognize as generally indicative of the structure of a black resides in the electrolyte absorption factor of a particular black. Said electrolyte absorption factor is determined by adding incrementally to a 5 gram carbon black sample a standard electrolyte solution comprising by weight about 30.5% $ZnCl_2$, about 27.2% $NH_4Cl$ and about 42.3% water. The total amount of electrolyte required to coagulate the carbon black into a single ball when shaken is then divided by the weight of the carbon black sample. Any black having an electrolyte absorption factor of greater than about 10 ml./5 grams is usually considered to be highly structured.

The electrical conductivity of a carbon black is inversely proportional to the specific resistivity thereof. Generally speaking, any black having a specific resistivity of below about 0.96 ohm-cm. is considered to be highly conductive. In accordance with the process of the present invention oil furnace blacks having an average specific resistivity of less than about 0.45 ohm-cm. can be produced. For the purposes of the present invention the specific resistivity of carbon black is ascertained utilizing a test devised by the U.S. Army Signal Corps. Said test comprises placing a sample of the subject carbon black in a cylindrical electrically non-conductive tube having a metallic electrode closure means at the base thereof. A plunger having a metallic electrode tip means is then inserted in the open end of the tube and sufficient weight is applied to said plunger to cause a force of 150 lbs.in.² to be impressed on the carbon black sample. The black sample comprises an amount of carbon black sufficient to provide a column of 25± 6 mm. when compressed. The metallic electrodes are then placed in circuit with a Wheatstone bridge and a resistivity measurement obtained. The following equation is then utilized to determine the specific resistivity of the black:

$$S = \frac{R \times A}{L}$$

where:

$S$=Specific resistivity of the sample (ohm-cm.).
$R$=Measured resistance (ohms).
$A$=Cross sectional area of column (cm.²).
$L$=Length of compressed sample (cm.).

For the purposes of comparison with the blacks producible in accordance with the process of the present invention, there are listed in Table I the electrolyte absorption factors and specific resistivities of some typical currently available commercial carbon blacks.

TABLE I

| Black | Manufacturer | Process | Electrolyte Absorption, ml./5 grams | Specific Resistivity (ohm-cm.) |
|---|---|---|---|---|
| Vulcan 6 (ISAF) | Cabot | Oil furnace | 10.5 | |
| XC-72 (XCF) | ....do | ....do | 13.0 | 0.575 |
| Acetylene Black | Shawinigan | Cracking of acetylene | 16.0 | 0.418 |

In accordance with the process of the present invention it was discovered that furnace blacks having unusually high structure and electrical conductivity are produced when carbon black is formed in a free carbon forming conversion zone and acetylene is continuously charged to the resulting conversion zone effluent.

The acetylene is charged to the conversion zone effluent while the heat content of said effluent is sufficient to initiate thermal cracking of the acetylene. It is known that thermal cracking of acetylene occurs when acetylene is heated to temperatures above about 1200° F. It is therefore important that the temperature of said effluent be at least about 1200° F. and preferably above about 1600° F. Obviously, the temperature of the acetylene at the can influence the temperature requirements. If the acetylene is preheted, somewhat lower effluent temperature will normally be required to initiate thermal cracking than if the acetylene is without prior heating. In any case, we much prefer that the temperature of the conversion zone effluent be at least 1600° F. when acetylene is charged thereto.

Although benefits of increased structure and electrical conductivity can be imparted to oil furnace blacks when acetylene is charged to the conversion zone effluent even after substantial settling out of the black from the flue gases has occurred, it is much preferred that the conversion zone effluent be maintained substantially completely as an aerosol until charging thereinto of acetylene has been accomplished. Although the point at which both the temperature and physical form of the conversion zone effluent are best suited for the introduction thereinto of acetylene is somewhat variable, it is obvious that said point generally naturally occurs in proximity to the downstream end of the conversion zone.

The rate and amount of acetylene charged to the conversion zone effluent is subject to considerable variation. After thermal cracking of the acetylene is initiated, said cracking continues exothermically (provided, of course, that excessive dilution does not occur) and thereby tends to increase the temperature of the effluent/acetylene mixture. For best results, it is important that the rate of acetylene addition to the conversion zone effluent be sufficient to raise the temperature of the resulting mixture to above about 2250° F. and preferably above about 2500° F. It is preferred, moreover, that the rate at which acetylene is charged to the conversion zone effluent be such that the theoretical yield of acetylene black (i.e., about 70 lbs./1000 ft.$^3$) producible therefrom represents between about 10% and about 75%, and most preferably between about 15% and about 40%, by weight of the total carbon black content of said effluent.

It has additionally been discovered in accordance with the present invention, that superior results are generally obtained when the conversion zone effluent comprises certain amounts of hydrocarbonaceous materials. Said hydrocarbonaceous materials normally consist of unconverted and/or incompletely converted hydrocarbon feedstock introduced to the conversion zone. It is pointed out that normally free carbon forming conditions which produce in the conversion zone effluent relatively high proportions of hydrocarbonaceous materials (i.e., above about 0.5% and especially above about 1% by weight) with respect to carbon black are stringently avoided because such conditions result in an inefficient conversion of the feedstock and because the presence of relatively large amounts of hydrocarbonaceous materials associated with carbon black generally result in undesirable properties such as severe agglomeration in the product black. In accordance with the present invention, however, benefits of increased electrical conductivity and structure are achievable when the conversion zone effluent has a hydrocarbonaceous material content of at least about 1%, preferably at least about 2%, and most preferably at least about 5%, by weight of the carbon black therein.

The conversion zone conditions required to produce an effluent comprising said amounts of hydrocarbonaceous materials are well known to the art. Generally speaking, any conditions which will produce either singly or in combination relatively low turbulence, short residence times, low overall combustion rates and relatively low temperatures will result in the presence of higher proportions of hydrocarbonaceous materials in the resulting product. Said conditions can be controlled in many ways and are generally well known in the carbon black producing art. For instance, lower residence time for a given volume flow of feedstock, fuel gas and combustion air (or other molecular oxygen containing gas) can be effected by reducing the length of the conversion zone. Likewise, lower turbulence for a given set of process conditions can be realized by increasing the cross-sectional area of said zone. The combustion rates and temperatures of a particular conversion zone at a given flow of feedstock can be lowered by a reduction in the amount of combustion air introduced thereto. It should be noted that, in general, the above-mentioned parameters are at least somewhat interrelated. Thus, the exact operating conditions required to produce an effluent comprising a given black associated with a given amount of hydrocarbonaceous materials are best determined during actual operations.

In addition it should be noted that when as preferred the effluent from the carbon forming zone comprises substantial hydrocarbonaceous materials, the rate of acetylene addition to the effluent must be sufficient to raise the temperature of the resulting mixture to above about 2250° F. and preferably above about 2500° F. for a period of time sufficient to yield a carbon black product having a hydrocarbonaceous material content of less than about 1%, preferably less than about 0.5%, and most preferably less than about 0.1% by weight and to thereby provide in said product higher structure and electrical conductivity.

There follow a number of non-limiting illustrative examples:

EXAMPLE 1

To one end of a refractory lined furnace about 22 feet long and 27 inches in diameter, there is continuously charged under relatively non-turbulent conditions about 1,200 s.c.f.h. of natural gas and about 18,000 s.c.f.h. air. The mixture is ignited and the combustion thereof allowed to continue until the interior temperature of the furnace about 14 feet from the downstream end is about 2400° F. Next, the air flow is increased to 32,900 s.c.f.h. and Sunray D-X fuel oil, a cycle stock sold by D-X Sunray Oil Corporation and preheated to about 400° F., is charged to the reaction zone at a rate of about 61 gallons per hour and the resulting reaction is allowed to continue for about 4 hours while the reaction products are continuously withdrawn from the downstream end of the furnace through cyclone type cooling and collection apparatus. Periodic samplings of the conversion zone effluent, i.e., the carbon black/flue gas mixture are tested by gas chromatographic analysis and it is found that said effluent about 14 feet from the downstream end of said furnace comprises an average hydrocarbonaceous material content of about 10% based on the weight of carbon black therein. During carbon black production, the temperatures of the furnace interior located at points about 14 feet and about 8 feet from the downstream end are continuously monitored and it is found that said temperatures remain at about 2300° F. and about 1900° F. respectively throughout the run. The specific resistivity and electrolyte absorption factor of the carbon black product are determined, the results of which determinations are shown in Table II below.

After 4 hours it is found that a total of about 1100 lbs. of carbon black having a hydrocarbonaceous materials content of about 4% by weight have been produced.

EXAMPLE 2

This example is a duplicate of Example 1 with the exception that substantially immediately after starting the introduction of the Sunray D-X fuel oil, acetylene is introduced into the conversion zone effluent. Said introduction is accomplished by continuously charging acetylene at a rate of about 7,300 s.c.f.h. (representing a yield of about 30% by weight of the total black produced) into the furnace through a port located about 10 feet from the downstream end thereof. The temperature of the resulting mixture of conversion zone effluent and acetylene 8 feet from the downstream end of the furnace (i.e., 2 feet downstream said port) is found to rise to and remain at about 2750° F. while the temperature 14 feet from the downstream end remains at about 2300° F. After about 4 hours of operation at the above conditions, the run is discontinued and the collected carbon black is subjected to the same determinations as was the carbon black product in Example 1. The results are set forth in Table II below. A total of about 1550 lbs. of carbon black having a hydrocarbonaceous materials content of less than 0.1% by weight is collected.

EXAMPLE 3

This example is a duplicate of Example 2 with the exception that the rate of acetylene charged to the conversion zone effluent is maintained at about 3,000 s.c.f.h. which represents a yield of about 14% by weight of the total carbon black produced. The interior temperatures taken 14 feet and 8 feet from the downstream end of the furnace are about 2300° F. and about 2500° F. respectively. Said product is subjected to the same determinations as was the carbon black product in Example 1. The results are set forth in Table II below.

EXAMPLE 4

This example is a duplicate of Example 1 with the exception that the carbon black producing conversion zone is operated under conditions which at a point about 14 feet from the downstream end of said furnace produce less than about 1% hydrocarbonaceous materials based on the weight of carbon black. In this example, there is continuously charged to and burned within the furnace about 1000 s.c.f.h. of natural gas and about 15,000 s.c.f.h. air. After the interior temperature of the furnace reaches about 2400° F. the air rate is increased to 42,300 s.c.f.h. and fuel oil preheated to about 400° F. is charged thereinto at a rate of about 61 gallons per hour. The interior temperature of the furnace taken at points 14 feet and 8 feet from the downstream end thereof rise to and stabilize at about 2600° F. and about 2200° F. respectively. Samples of the conversion zone effluent at a point about 14 feet from the downstream end of the furnace are withdrawn periodically and analyzed for hydrocarbonaceous materials and it is found that only about 0.8% hydrocarbonaceous materials are present based on the weight of the carbon black.

Samples of the carbon black product are analyzed for electrolyte absorption and specific resistivity, the results of which analyses are shown in Table II. After about 4 hours of operation under these conditions, it is found that about 765 lbs. of black having a hydrocarbonaceous materials content of about 0.3% by weight of the black are produced.

EXAMPLE 5

The carbon black operation of Example 4 is continued under the conditions set forth in Example 4, with the exception that addition of acetylene (7,300 s.c.f.h.) to the conversion zone effluent is effected in the manner of Example 2. The temperature of the conversion zone effluent at a point 8 feet from the downstream end of the furnace rises to about 2800° F. After about 4 hours operations are discontinued. The carbon black product is analyzed and the results are shown in Table II. It is further found that about 1225 lbs. carbon black having a hydrocarbonaceous materials content of about 0.05% by weight of the black are produced.

It should be noted that the benefits of increased structure and/or electrical conductivity accomplished by the process of the present invention are vastly greater than one skilled in the art would expect simply by intimately dispersing acetylene black in an oil furnace black. The following example is presented to allow comparison of the properties of an intimate mechanical mixture of an oil furnace black and an acetylene black and the blacks producible in accordance with the present invention. Moreover, it should be noted that the use of acetylene in accordance with the present invention produces a substantial increase in overall yield by rendering feasible operation under conditions where the yield of carbon black per cubic foot of fuel gas and/or gal. of fuel oil is greatly enhanced.

EXAMPLE 6

To a glass column there is charged 1.25 lbs. of the carbon black produced in Example 4 and 0.75 lb. of a commercial acetylene black. The carbon black bed thus produced is then fluidized with dry nitrogen for about four hours. Subsequently, a sample of the resulting carbon black mixture is analyzed for electrical resistivity and electrolyte absorption. The results are shown in Table II below.

TABLE II

| | Electrolyte Absorption, ml./5 grams | Specific Resistivity, ohm-cm. |
|---|---|---|
| Example 1 | 9 | 0.70 |
| Example 2 | 16 | 0.40 |
| Example 3 | 14 | 0.42 |
| Example 4 | 13 | 0.57 |
| Example 5 | 14.5 | 0.51 |
| Example 6 | 14 | 0.56 |

Obviously, many changes can be made in the above examples and description without departing from the scope of the invention.

For instance, although no mention was made in the above examples of preheating the acetylene prior to addition thereof to the conversion zone effluent, obviously such preheating can be utilized if desired.

Moreover, although only oil furnace carbon blacks were produced in the above examples it is obvious that the present invention is applicable to the production of other carbon blacks such as gas furnace blacks and oil enriched-gas furnace blacks, for example.

Accordingly, it is intended that the above disclosure be regarded as illustrative and as in no way limiting the scope of the present invention.

What we claim is:

1. A process for producing electrically conductive and highly structured carbon black which comprises charging into a product stream in aerosol form from a heated free carbon forming zone, while said stream has a temperature above about 1200° F. and comprises carbon black and at least about 1% by weight of said carbon black of hydrocarbonaceous materials, sufficient acetylene to provide a carbon black yield from said acetylene of at least about 10% by weight of the total carbon black product and to raise the temperature of the resulting mixture to above about 2250° F. for a period of time sufficient to reduce the content of said hydrocarbonaceous materials to less than about 1% by weight of the total carbon black product.

2. The process of claim 1 wherein said acetylene is charged into said stream while said stream has a temperature of at least about 1600° F.

3. The process of claim 1 wherein the amount of hydrocarbonaceous materials in said aerosol stream when said acetylene is charged thereinto represents above about 2% by weight of the carbon black in said stream.

4. The process of claim 1 wherein the content of hydrocarbonaceous materials in said aerosol stream when said acetylene is charged thereinto represents above about 5% by weight of the carbon black in said stream.

5. The process of claim 1 wherein the amount of acetylene charged into said stream is sufficient to raise the temperature of the resulting mixture to above about 2500° F.

6. The process of claim 1 wherein the amount of acetylene charged into said stream represents a theoretical yield of carbon black of between about 15% and about 40% by weight of the total carbon black product.

7. The process of claim 1 wherein the temperature of said mixture is maintained above about 2250° F. for a period of time sufficient to reduce the content of hydrocarbonaceous materials to less than about 0.5% by weight of the total carbon black product.

8. The process of claim 1 wherein the temperature of the stream after acetylene addition is maintained at a temperature above about 2250° F. for a period of time sufficient to reduce the content of hydrocarbonaceous materials to less than about 0.1% by weight of the total carbon black product.

9. The process of claim 1 wherein the feedstock to said free carbon forming zone is an essentially liquid hydrocarbon.

References Cited

UNITED STATES PATENTS 2,768,067  10/1956  Heller _____ 23—209.4

OTHER REFERENCES

Benson et al. in "Industrial Carbon," by C. L. Mantell, copyright, 1946, second edition, D. Van Nostrand Co., Inc., New York, pages 81–88.

EDWARD J. MEROS, *Primary Examiner.*